United States Patent [19]

Stanger

[11] 4,163,445
[45] Aug. 7, 1979

[54] ROOFING PANELS

[76] Inventor: Colin N. Stanger, Niavaran. 3 Grenville, Close, Cobham, Surrey, England

[21] Appl. No.: 783,787

[22] Filed: Apr. 1, 1977

[30] Foreign Application Priority Data

Apr. 2, 1976 [GB] United Kingdom ............... 13467/76

[51] Int. Cl.² .................................................. F24J 3/02
[52] U.S. Cl. ...................................... 126/428; 52/545
[58] Field of Search ................. 52/520, 533, 543, 545, 52/552; 126/270, 271; 237/1 A

[56] References Cited

U.S. PATENT DOCUMENTS

| | | | |
|---|---|---|---|
| 3,473,274 | 10/1969 | Godes | 52/543 |
| 3,703,062 | 11/1972 | McKinney | 52/545 |
| 3,945,166 | 3/1976 | Hosoda et al. | 52/545 |
| 3,983,675 | 10/1976 | Pearse et al. | 52/533 |
| 4,029,080 | 6/1977 | Warren | 126/271 |

Primary Examiner—Kenneth W. Sprague

Attorney, Agent, or Firm—Roylance, Abrams, Berdo & Farley

[57] ABSTRACT

An elongate roofing panel for assembly on a support structure with a plurality of like panels to form a roof covering. The panel has a first elongate edge adapted to be fixed to the support structure; and a second elongate edge opposite to the first elongate edge, adapted to engage the first elongate edge of an adjacent panel to restrain the second edge against movement normal to the plane of the panel. The elongate edges are formed as respective first and second beam elements projecting on opposite sides of the panel for supporting the panel on the support structure, and the panel is formed with ribs spanning transversely between the beam elements for transmitting thereto the load of the panel. Ideally the panel also serves as a solar heating panel, the ribs defining transverse ducts in which a fluid is heated as it is conveyed across the panel from an entry to an exit duct, these latter extending longitudinally from one end of the panel to the other.

15 Claims, 10 Drawing Figures

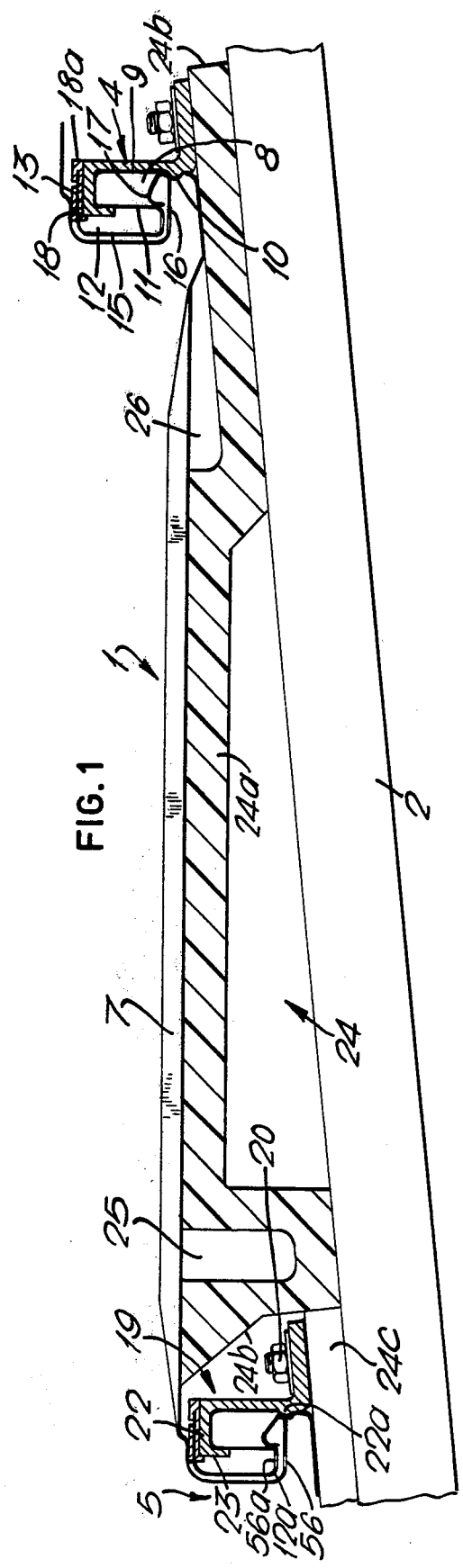
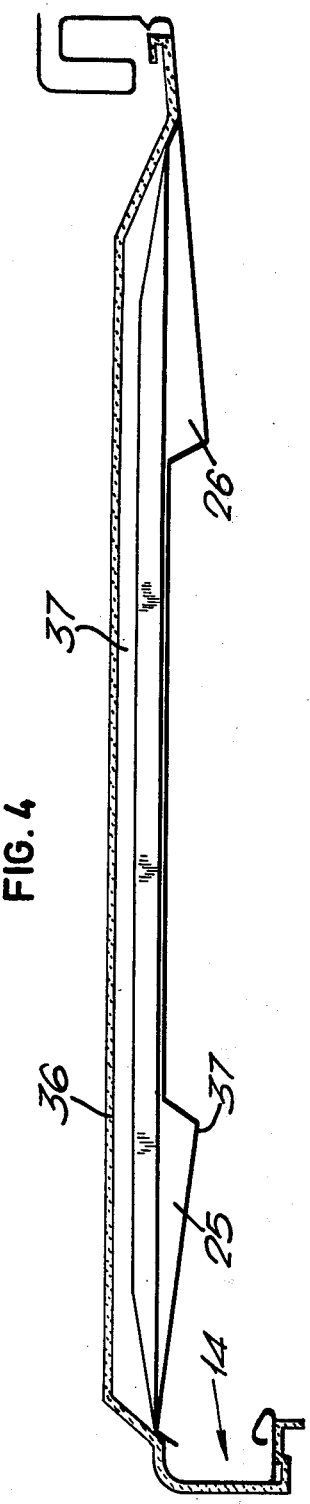

ROOFING PANELS

This invention relates to roofing panels and to roofing systems incorporating such panels.

The term roofing panels, as used herein, includes panels capable of being used in the assembly of protective coverings in various forms of domestic, industrial and agricultural building structure, particularly where low cost roofing is required.

According to one aspect of the invention, there is provided an elongate roofing panel for assembly on a support structure with a plurality of like panels to form a roof covering, said panel having a first elongate edge adapted to be fixed to said support structure; and a second elongate edge opposite to the first elongate edge, adapted to engage the first elongate edge of an adjacent panel to restrain said second edge against movement normal to the plane of the panel, said elongate edges being formed as respective first and second beam elements projecting on opposite sides of the panel for supporting the panel on the support structure, and the panel being formed with ribs spanning transversely between the beam elements for transmitting thereto the load of the panel.

Preferably the second beam element is formed as a cover element at least partially to conceal the first beam element of an adjacent panel when these elements are mutually engaged.

The first elongate edge is preferably adapted to be fixed in such a way that the first beam element will project upwardly from the support rafters to support the second edge of an adjacent panel, and the second beam element will overlap and engage with the first beam element of another adjacent panel.

The panel may be mounted across sloping support rafters with the first edge at a higher level than the second edge, and the panel may be fixed either directly to the rafters at points adjacent the first beam element, or indirectly by upwardly projecting brackets mounted on the rafters.

According to another aspect of the invention there is provided a roofing system comprising a support structure and a plurality of elongate roofing panels mounted thereon to form a roof covering, each panel being fixed to said support structure along a first elongate edge and having a second elongate edge, opposite to the first, in engagement with the first elongate edge of an adjacent panel thereby to restrain the second edge against movement in a direction normal to the plane of the panel, said panels being supported on the support structure by means of first and second beam elements formed at said first and second elongate edges respectively and projecting on opposite sides of the panel, the panels also being formed with ribs spanning transversely between the beam element for transmitting the load of the panels thereto.

Preferably, the panels are also adapted to be used as solar heating panels, means being provided to define elongate fluid entry and exit ducts extending parallel, and adjacent to the respective edges of the panel, and to define, with said ribs transverse ducts which communicate at or adjacent their opposite ends with the entry and exit ducts. When coupled in a heating system, fluid, preferably air, is supplied to the entry ducts of the panels, passes along the transverse ducts where it is heated by solar energy collected by the panel and is extracted from the exit duct. Heat derived from the extracted air can be used to heat the interior of the building of which the panels form the roof covering, or can be supplied to an energy exchange unit to heat water, or generate electricity, etc.

Reference will now be made to the accompanying drawings, in which:

FIG. 1 is a transverse cross section of a panel according to the invention, shown fixed to a support structure with two like panels.

FIG. 4 illustrates, in transverse cross-section a modification to the panel of FIG. 1;

Figure 2:
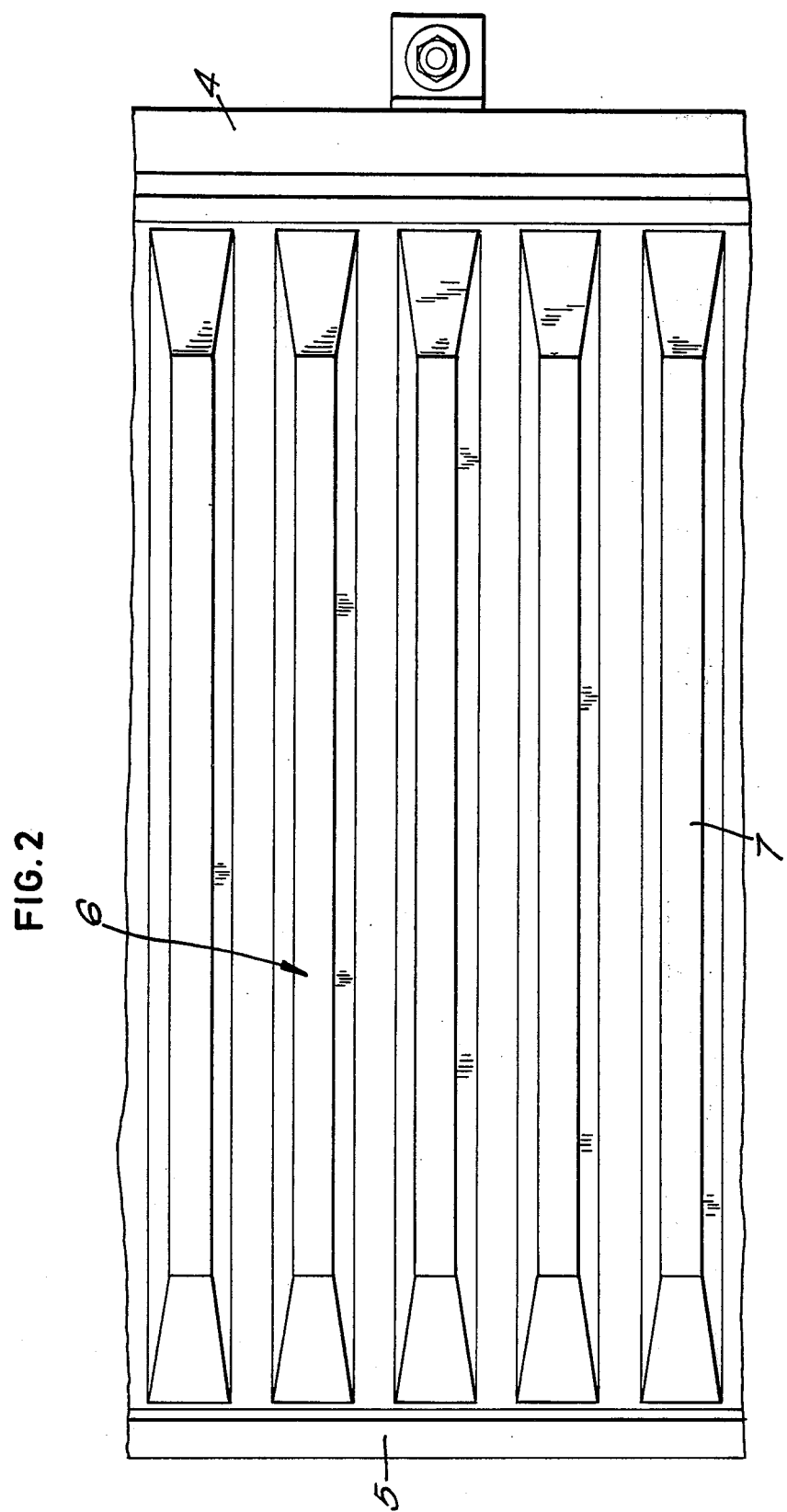
FIG. 2 is a plan view of a part of the panel of FIG. 1 illustrating its fixing to the structure.
Figure 3:
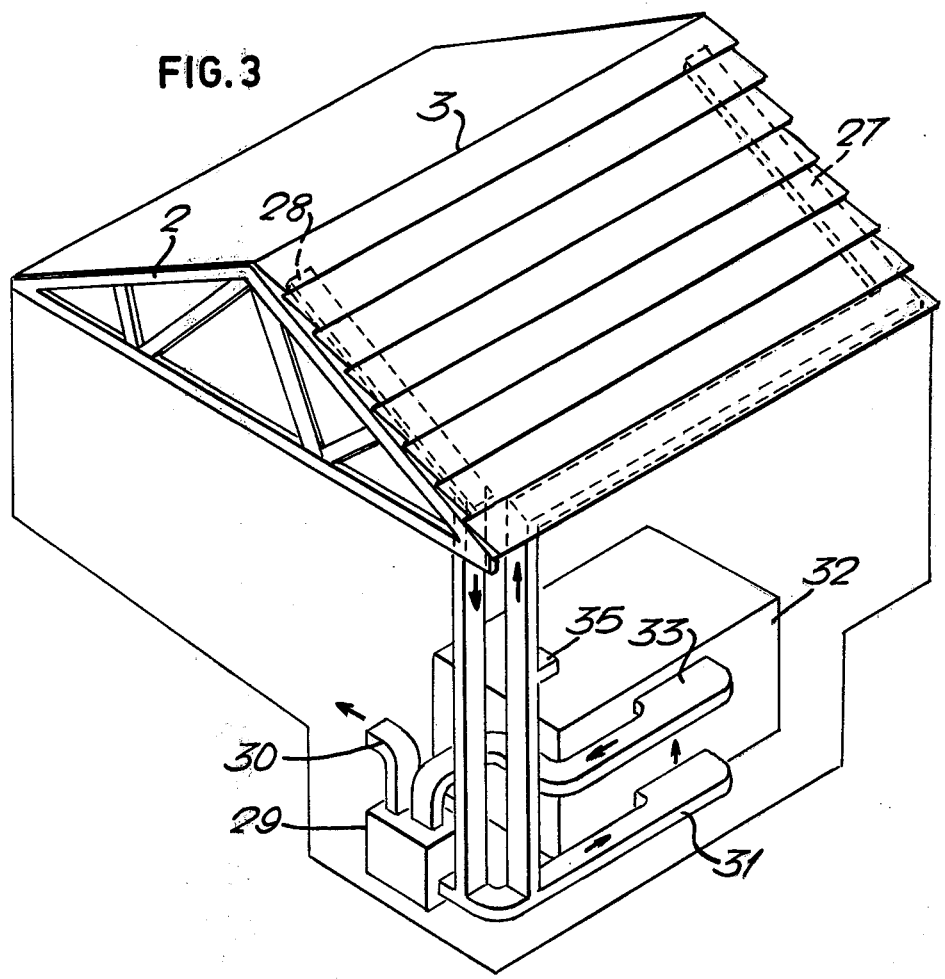
FIG. 3 illustrates a building including a roofing system according to the invention, the panels also forming the heat collector of a solar heating system for the building.

With reference to FIGS. 1 to 3 a roofing system comprises a plurality of elongate roofing panels 1 arranged to span longitudinally across main supporting rafters 2 of a roof structure, and to lock together at their elongate edges to provide a durable protective roof covering. The panels extend parallel to the roof's ridge 3, from which the rafters 2 slope downwardly toward the eaves.

Each panel 1 is integrally formed at its two parallel elongate edges with a beam element 4 and 5 respectively to provide the panel with longitudinal rigidity. The beam element 4 provides support for the panel across the rafters 2, and the beam element 5 forms a cover element. For the sake of convenience the edges at which the elements 4 and 5 are formed will hereinafter be referred to as respectively upper and lower edges in accordance with their relative vertical disposition in the assembled system of FIG. 3. The beam elements comprise channel sections, formed at the panel's lateral edges, of particular shape and configuration to provide rigid interlocking of the panels and watertight seal therebetween.

A central region 6 of the panel between the beam and cover elements is provided with ribs 7 pressed out of the material of the panel and spanning across the width of the panel to provide lateral stiffness and transmit the roof load to the beam elements 4, 5. Nevertheless this central region will for the purpose of describing the shape of the beam elements be considered as substantially planar.

The beam element 4 projects generally upwardly from the plane of the central region 6, and is produced by forming the upper edge of the panel with a number of right-angle bends to form a substantially S-shaped double channel section.

One channel 8 opens downwardly toward the plane of the panel and is defined on one side by an upstanding wall 9 formed with a longitudinal locking rib 10 the function of which will be explained later. An intermediate wall 11 separates the channel 8 from adjacent channel 12 which is L shaped, the profile of the beam element 4 terminating in a ledge 13, which supports the lower edge of the next upper adjacent panel in a region adjacent its cover element 5. This cover element comprises a depending flange 14, shaped for complementary abutment with an outer wall 15 of the beam element 4. Projecting rearwardly from the bottom edge of the flange 14 is an elongate strip 16 whose outer end is bent over twice to form an engagement lip 17. Two rows of ventilation apertures in the form of slots 56, 56a are formed in the strip 16 and in the base 12a of the channel 12 respectively, to inhibit the formation of condensation on the inside surface of the roofing panel. Air can flow through the communicating slots 56, 56a and into the building via the channel 12, which, it should be noted, is closed only at the bracket positions.

Preferably the panel also serves as a solar heating panel. To this end an elongate lining sheet 24 is fixed to the under surface of the central region 6 to close off the ribs 7 downwardly, thereby forming a multiplicity of parallel transverse ducts. The sheet 24 is shaped to form elongate fluid entry and exit ducts 25 and 26 extending longitudinally at the lower and upper edges of the panel respectively and communicating with respective ends of the transverse ducts. Fluid, preferably air, supplied to the entry duct 25 would be heated in the transverse ducts by solar energy and would rise to the exit duct 26 where it can be drawn off and used as will be explained later. The sectional dimensions of the ducts 25 and 26 depend partly upon the fluid employed. In this embodiment the sheet 24 is formed of foamed polyurethane or other suitable cellular material 24a lined on the underside to suit the internal roof finish required, in this case with a thin metal sheet 24b. Such a sheet provides good thermal insulation to reduce heat loss from the building through the roof.

When assembled as shown in FIG. 1, the lower edge of each panel is supported on the ledge 13 of the beam element 4 of the next lower adjacent panel, and its cover portion 5 substantially conceals that beam element. The strip 16 projects toward the wall 9 and the engagement lip 17 engages behind the lower edge of the intermediate wall and over the locking rib 10 and is stressed between these two elements, the relative dimensions being such that part of a strip 18 of compressible material, such as bituminous felt, and fitted on the ledge 13 is compressed between beam elements 4 and 5 in the assembled state. This strip 18 serves to eliminate vibration between adjacent parts of the elements 4 and 5 and enables a tight engagement between adjacent panels to be achieved even with substantial tolerances in the dimensions of the channel sections. Compressible gaskets 18a for instance of plastics material fit over the free edge of the ledge 13 at the bracket position and likewise serve to eliminate vibration between the brackets and the ledge 13.

The panels 1 are fixed to the rafters 2 by means of a plurality of brackets 19. Each rafter has a plurality of such brackets affixed thereto by bolts 20 and spaced apart by a distance corresponding substantially with the width of the panel, so that each panel is mounted on the roof structure by means of a row of brackets, one on each rafter supporting the panel. Each bracket includes a fixing plate 21 through which the bolt 20 passes, and which is fixed thereby to the rafter with a projecting strip 24c of the sheet 24 clamped thereby, and a key member 22 which projects laterally into the L shaped channel 12, and which has, near the fixing plate, a bead 22a which cooperates with the locking rib 10 to locate the panels. In particular, the key member 22 has a downwardly projecting tongue 23 which engages over the upper edge of the intermediate wall 11. The engagement of the brackets with the panel prevents movement of the latter in either direction parallel to the rafters and in a direction normal to the general plane of the panel.

The above described panel construction avoids the necessity not only to provide separate transverse beam elements in the roof support but also to fix the panels along both edges, since the lower edges of the panels are restrained by the above-mentioned interlocking engagement. Assembly of the roofing system is thus relatively rapidly and simply achieved by fixing each panel in turn by engaging the requisite number of brackets 19 in the beam element 4, locating the cover element over the beam element of the previously fixed panel, so that the lip 17 is located as described above, and bolting the brackets 19 to the rafters 2.

In FIG. 3, eight panels form one side of a double pitched roof and are coupled in parallel on a solar heating system including a main supply and outlet ducts 27 and 28 which communicate with each entrance duct 25, and exit duct 26 respectively. The heated fluid, air in this case, is directed by an air handler 29 either directly to the interior of the building, via duct 30 or via duct 31 to a heat store 32, for instance a large mass of pebbles in an insulated pit. Warm air can be extracted from the store 32 via duct 33 for recirculation to the roofing panels via duct 34 which joins a return air duct 35 and couples to the main supply duct 27, or for supply to the buildings interior.

Energy may be derived from the heated fluid in many other ways to be used for purposes other than indoor heating, e.g., for refrigeration or power generation.

The panel illustrated in FIG. 4 includes a transparent cover 36, for instance of acrylic resin, fixed to the upper surface and arranged to define an enclosed air space 37 over the ribbed central portion 7. At its lower edge the cover 36 engages the outer surface of the depending flange 14, but it does not interfere with the interlocking of the beam elements 4 and 5. The cover improves the thermal efficiency of the solar heating/roofing panels by reducing in known manner, re-radiation from the panel surface. The lining sheet 24 comprises, in this embodiment, a single layer of metallic sheet 37 shaped to provide the entrance and exit ducts 25 and 26, and does not, in this embodiment project beyond the beam element 4. Accordingly, the brackets 19 bolt directly to the rafters, and longitudinal movement of the panel is permitted since the key member can slide within the elongate channel 12. This feature is particularly advantageous in allowing for longitudinal thermal expansion and contraction of the panel in extreme external climatic conditions, to inhibit longitudinal compression or tension forces which may cause distortion of the panel, for instance by buckling in high temperature. In constructing a roof using these panels, a layer of thermally insulating material is provided beneath the panels to optimise the efficiency of the solar heating system.

Figure 5:
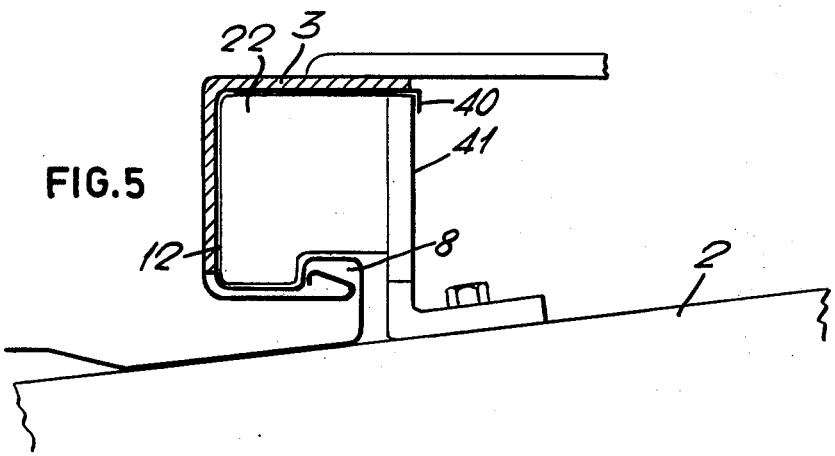
FIG. 5 illustrates in section the joint between two like panels of another embodiment.
Figure 6:
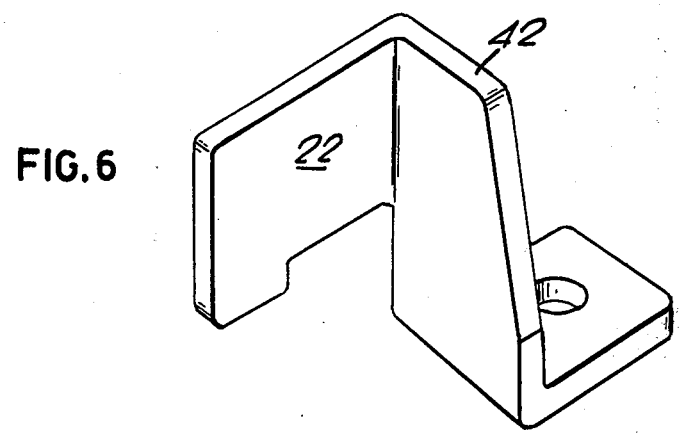
FIG. 6 illustrates, in perspective a mounting bracket for mounting the panels of FIG. 5 to a support structure.

In the embodiment of FIGS. 5 and 6 the channel 8 is reduced in depth, and the bracket is of modified form having a key member 22 which fits tightly within a longitudinal recess comprising the L-shaped channel 12. A depending lip 40 at the rear edge of the ledge 13 lies flush against a rear surface 41 of an upstanding flange 42 which spaces the key member 22 from the rafter 2. Attachment of the brackets to the beam elements is simply achieved by inserting the key member 22, with its plane parallel to that of the panel, into the channel 2 and rotating through 90°.

Figure 7:
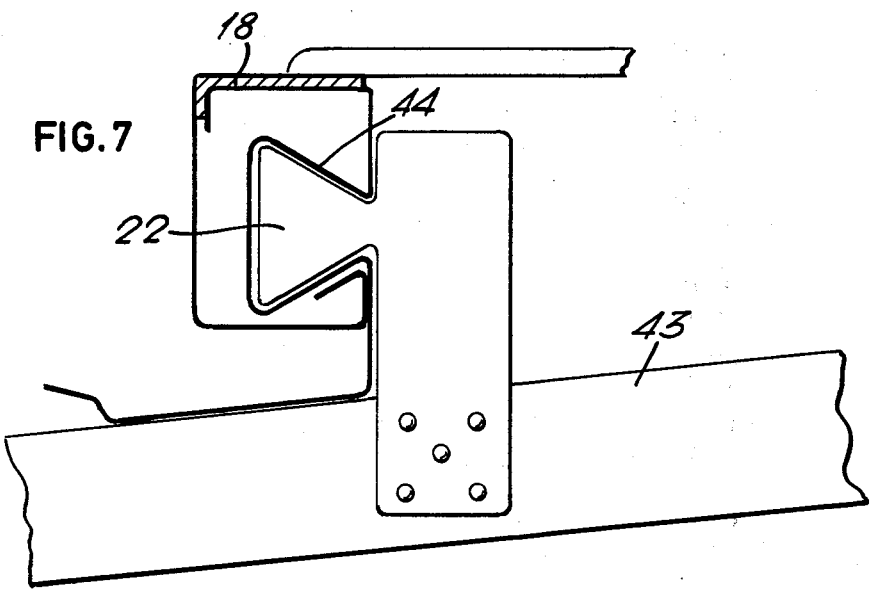
FIGS. 7 to 10 illustrate four further embodiments by showing, in section the joints between respective pairs of like panels according to the invention.

In the embodiment of FIG. 7, the bracket 19 again has a key member 22, but is adapted for attachment, for instance by nailing, to the side surface 43 of a timber rafter. Again the key member 22 and the elongate recess in the beam element 4 are correspondingly shaped, this time to provide a dovetail-like mutual engagement. The elongate recess is formed by an intermediate dovetail channel 44 in an upstanding flange 46 forming the beam element 4. One advantage of this construction is that any forces acting transverse to the panel act across the width of the bracket, whereas in the previous embodiments, such forces act only across the thickness of the bracket. The shear resistance to these forces is accordingly greater.

Figure 8:
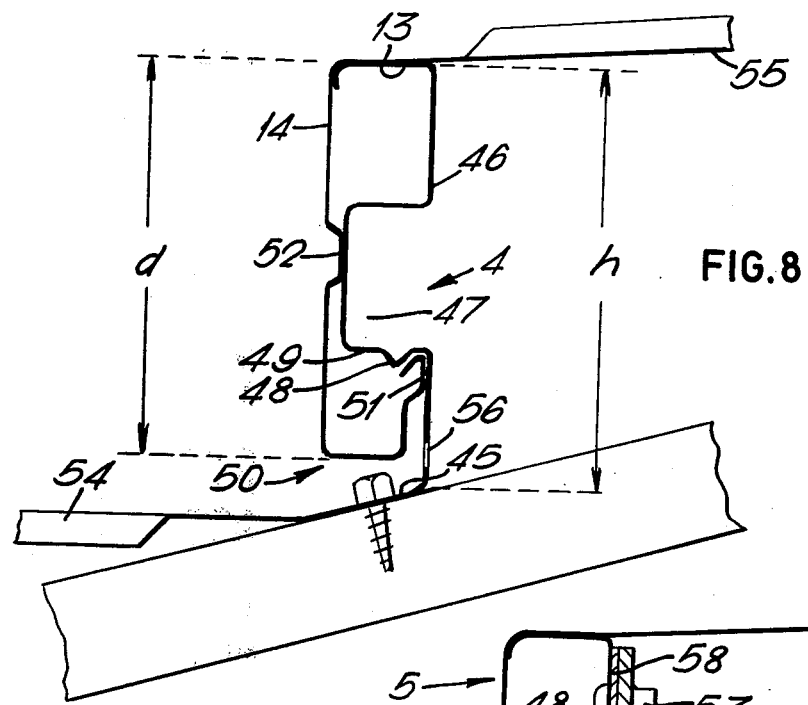

In the embodiment of FIG. 8, each panel is bolted direct to the rafters through a strip portion 45 adjacent the upper beam element 4. The beam element 4 comprises an upstanding flange 46 of height h bent over at its upper edge to provide the ledge 13. An intermediate U-section channel 47 is formed in the flange 46, and is open outwardly of the panel, and a V-shaped ridge 48 is formed in a lower wall 49 of this U-section channel 47.

The cover element 5 comprises a depending flange 14 of height d, less than h formed with a U-sectioned lower edge 50 having a bent-over lip 51. The flange 14 also has an elongate inner rib 52 formed by an intermediate groove.

The lip 51 is retained between the inner wall of the flange 46 and the ridge 48, and the difference between the heights h and d of the flanges 46 and 14 respectively allows a small space for the bolt heads 53. The rib 52 presses on a surface 53 of the U-section channel 47 to maintain a firm interlocking engagement between the cover and beam element. The unsightly bolt fixings are substantially concealed by the overhang of the cover elements, which also conceal the convoluted form of the beam elements.

In this embodiment the ribs comprise interdigitated fingers 54, 55 projecting from the upper and lower edges respectively of the panel, the plane of the fingers 54 being raised slightly above the plane of the fingers 55.

A single row of ventilation slots 56 provided in the flange 46 below the U-section channel 47 can replace the double row employed in the earlier embodiments. Air can flow to the slots through the gap between the strip portion 45 and the bottom edge of the cover element.

Figure 9:
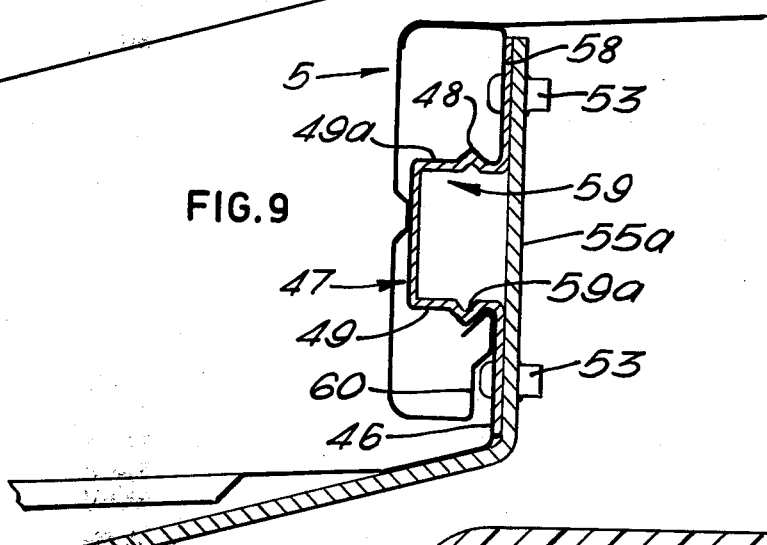

In the embodiment of FIG. 9 the beam elements 4 are bolted through their flanges 46 to brackets 55a mounted on the support rafters. A jointing sleeve 58 has a projection 59 which fits in complementary fashion in the U-section channel 47 and serves to join two panels together end-to-end when the roof length is greater than the modular length of the panel. Projecting ridges 48 are formed in both the upper 49a and lower 49 wall of the channel 47 to provide internal grooves in which ribs 59a of the projection 59 engage. The bolts 53 pass through both the flange 46 and the sleeve 58, and are fully concealed by the cover element 5, which is recessed at 60 to accommodate the heads of the lower bolts 53. The joints between panels are conveniently sealed with self adhesive tape of synthetic rubber or other suitable plastics material.

The panels illustrated in FIGS. 1 to 9 may be rolled or pressed from sheet metal, for instance steel, or alternatively formed by extrusion in a suitable plastics material, the ribs 7 being conveniently pressed into the material soon after it leaves the extrusion head while it is still relatively pliable, and the continuous extrusion being subsequently cut into panels of required length.

Figure 10:
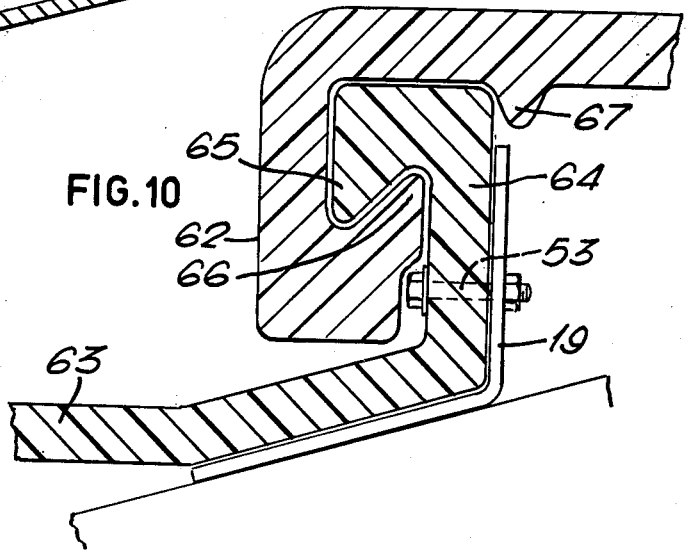

In the embodiment of FIG. 10 the panel is formed integrally with its own thermal insulation. The panel is made from a sheet of foamed plastics material whose outer surface is cured or otherwise hardened, to form a hard, tough skin 62 enclosing a core 63 of the foamed plastics material. The physical strength of the panel is provided by the skin, while the core provides good thermal insulation. The beam element has an upstanding flange 64 which can be secured by bolts 53 to brackets 19 mounted on the rafters. The top edge of the flange 64 is formed to provide a shoulder 65 under which a lip 66 integrally formed in a cover element 5 provided at the lower edge of the panel engages. An elongate bead 67 formed in the under surface of the panel adjacent the cover element 5 assists in maintaining the beam element and the cover element locked together.

I claim:

1. In a roof structure of the type described, the combination of a roof support structure;

a plurality of interlocking elongated roofing panels mounted on said support structure to form a roof covering, each of said panels comprising an elongated sheet having a first elongated edge, a second elongated edge spaced from and opposite to said first edge, the panel being secured to the support structure only along said first elongated edge, first and second load-bearing beam elements which extend continuously along the length of the panel and support the panel on the support structure and are formed by elongated portions of said sheet of bent configuration adjacent said first and second edges respectively, said first beam element being disposed generally above the sheet and said second beam element being disposed generally below the sheet, a plurality of ribs spanning transversely between said beam elements for transmitting the load of the panel thereto, the first beam element supporting said second elongated edge of the next adjacent panel, and the second beam element constituting a cover element which overlaps the first beam element of the next adjacent panel and engages the same continuously along its entire length so as to at least partially conceal the first beam element and restrain said second elongated edge against movements in a direction normal to the plane of the panel.

2. The combination defined in claim 1 wherein in respect of each roofing panel the first beam element is formed with an elongate recess for mating with one or more mounting brackets for fixing the panel, and with an engagement channel, the second beam element having a projection shaped to engage in said engagement channel.

3. The combination defined in claim 2 wherein in respect of each roofing panel the first beam element is substantially S-shaped in cross-section having three spaced, parallel walls defining said recess and engagement channel, the projection comprising an engagement lip carried at the lower edge of a depending flange forming the second beam element.

4. The combination defined in claim 3 wherein in respect of each roofing panel one of the walls defining the first channel is formed with a locking rib for retaining the engagement lip stressed within the first channel.

5. The combination defined in claim 1 wherein in respect of each roofing panel the first beam element comprises an upstanding flange with an intermediate dovetail section channel forming an elongate recess to mate with a complementary shaped key member on a mounting bracket, and the second beam element comprises a depending flange formed at its lower edge with a projection for engaging said upstanding flange.

6. The combination defined in claim 1 wherein in respect of each roofing panel the first beam element comprises an upstanding flange having an intermediate U-section channel, and the second beam element comprises a depending flange shaped to bear against the outer surface of the U-section channel and provided at its lower edge with a projection for engaging the upstanding flange.

7. The combination defined in claim 1 wherein each panel is formed of a composite sheet material having a relatively hard outer skin, and a core of cellular thermally insulative material.

8. The combination defined in claim 1 wherein at least one of said beam elements of each roofing panel is formed with ventilation apertures.

9. The combination according to claim 8 wherein in respect of each roofing panel each beam element has ventilation apertures, so positioned as to communicate with the apertures of the other beam element of the adjacent panel.

10. The combination defined in claim 6 wherein said upstanding flange of each roofing panel is formed with a row of ventilation slots beneath the U-section channel.

11. The combination defined in claim 1, wherein at least one of the panels is adapted to function as a solar heating panel and comprises lining means fixed beneath a central portion of the elongated sheet between said first and second beam elements and cooperating with said central portion to define passageways to conduct through the panel a fluid heat transfer medium, and also forming fluid entry and exit ducts communicating with said passageways, the combination further comprising means for supplying heat transfer fluid to said entry duct, means for conducting heat transfer fluid from said exit duct, and means for deriving energy from the fluid conducted from the exit duct.

12. The combination defined in claim 11 wherein each of the at least one of the panels includes a transparent cover sheet overlying the part of the panel provided with said ribs and spaced therefrom.

13. The combination defined in claim 11, in which the fluid supplied to the panel is air.

14. The combination defined in claim 11, wherein said fluid entry and exit ducts are mutually parallel, extend longitudinally of the elongated panel, and are spaced transversely thereof;

said passageways including portions defined by cooperation of said lining means and said ribs.

15. The combination defined in clam 14 wherein each of the at least one of the panels includes a transparent cover sheet overlying the part of the panel provided with said ribs and spaced therefrom.

* * * * *